United States Patent
Padmanabhan et al.

(10) Patent No.: US 7,421,510 B2
(45) Date of Patent: Sep. 2, 2008

(54) METHOD AND SYSTEM FOR IDENTIFYING LOSSY LINKS IN A COMPUTER NETWORK

(75) Inventors: Venkata N. Padmanabhan, Bellevue, WA (US); Lili Qiu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 10/360,282

(22) Filed: Feb. 7, 2003

(65) Prior Publication Data

US 2004/0044759 A1    Mar. 4, 2004

Related U.S. Application Data

(60) Provisional application No. 60/407,425, filed on Aug. 30, 2002.

(51) Int. Cl.
*G06F 15/16* (2006.01)
*G01R 31/08* (2006.01)
*H04L 5/12* (2006.01)

(52) U.S. Cl. .................. 709/235; 709/232; 709/234; 709/224; 370/230

(58) Field of Classification Search .............. 709/232, 709/234, 235, 224; 370/230, 230.1
See application file for complete search history.

(56) References Cited

U.S. PATENT DOCUMENTS

| | | | |
|---|---|---|---|
| 6,195,622 B1 | 2/2001 | Altschuler et al. | |
| 6,606,301 B1 | 8/2003 | Muller et al. | |
| 6,725,025 B1 | 4/2004 | Schmidl et al. | |
| 6,839,754 B2 * | 1/2005 | Nowak et al. | 709/224 |
| 7,072,811 B2 | 7/2006 | Kadane et al. | |
| 7,095,979 B2 | 8/2006 | Stout | |
| 2002/0016699 A1 | 2/2002 | Hoggart et al. | |
| 2002/0055913 A1 | 5/2002 | Rajan | |
| 2004/0044764 A1 | 3/2004 | Padmanabhan | |
| 2004/0044765 A1 | 3/2004 | Meek et al. | |

OTHER PUBLICATIONS

Padmanabhan, Venkat, et al., "Server-Based Characterization and Inference of Internet Performance", Microsoft Research, *UCLA/IPAM Workshop* (Mar. 2002), 29 pages.

Padmanabhan, Venkat., et al., "Server-Based Inference of Internet Performance", *Technical Report MSR-TR-2002-39*, Microsoft Research, Microsoft Corporation (May 2002), 15 pages.

Allman, Mark, "A Web Server's View of the Transport Layer", *Computer Communication Review, ACM SIGCOM*, vol. 30, No. 5 (Oct. 2000), pp. 10-20.

(Continued)

*Primary Examiner*—Glenton B. Burgess
*Assistant Examiner*—Philip J Chea
(74) *Attorney, Agent, or Firm*—Wolf Greenfield & Sacks, P.C.

(57) ABSTRACT

A computer network has links for carrying data among computers, including one or more client computers. Packet loss rates are determined for the client computers and, a system of equations is set up expressing the relationship between the loss rates at the client computers and the loss rates at the links. The system of equations is then solved using one or more linear programming techniques, and optimized by making an effort to find the most parsimonious solution.

23 Claims, 4 Drawing Sheets

OTHER PUBLICATIONS

Balakrishnan, Hari, et al., "Analyzing Stability in Wide-Area Network Performance", *in Proceedings of The 1997 ACM Sigmetrics International Conference on Measurement and Modeling of Computer Systems*, Performance Evaluation Review, Special Issue vol. 25, No. 1 (Jun. 1997), pp. 2-12.

Caceres, R., et al., "Multicast-Based Inference of Network-Internal Characteristics: Accuracy of Packet Loss Estimation", *in Proceedings of IEEE INFOCOM '99: The Conference on Computer Communications, vol. 1, Eighteenth Annual Joint Conference of IEEE Computer and Communications Societies* (Mar. 1999), pp. 371-379.

"Cisco Distributed Director" retrieved from http://www.cisco.com/warp/public/cc/pd/cxsr/dd/index.shtml on Mar. 13, 2002, 1 page.

Downey, Allen, "Using Pathchar to Estimate Internet Link Characteristics", *in ACM SIGCOMM '99 Conference: Applications, Technologies, Architectures, and Protocols for Computer Communications* (1999), pp. 241-250.

Duffield, N.G., et al., "Inferring Link Loss Using Striped Unicast Probes", *in Proceedings of IEEE INFOCOM '2001 The Conference of the IEEE Computer and Communications Societies* (Apr. 2001), pp. 915-923.

Fraleigh, Chuck, et al., "Packet-Level Traffic Measurements from a Tier-1 IP Backbone", *Sprint Technical Report TR-01-110101*, 10 pages.

Geman, Stuart, et al., "Stochastic Relaxation, Gibbs Distributions and the Bayesian Restoration of Images", *in IEEE Transactions on Pattern Analysis and Machine Intelligence*, vol. PAMI-6, No. 6 (Nov. 1984), pp. 721-741.

Gilks, W.R., et al., *"Markov Chain Monte Carlo in Practice"*, Chapman & Hall/CRC, Boca Raton, Florida (1996)' pp. 1-486.

"TCPDUMP"—retrieved from http://www.dia.uniroma3.it/~valecchi/appendice/tcpdump.html on Apr. 23, 2003, 13 pages.

Katabi, Dina, et al., "A Passive Approach for Detecting Shared Bottlenecks", *in Proceedings of the 10th International Conference on Computer Communications and Networks* (Oct. 2001), pp. 174-181.

Krishnamurthy, Balachander, et al., "On Network-Aware Clustering of Web Clients", *in Proceedings of ACM SIGCOMM '2000 Conference on Applications, Technologies, Architectures and Protocols for Computer Communications* (Aug. 2000), pp. 97-110.

Mogul, Jeffrey, et al., "Potential Benefits of Delta Encoding and Data Compression for HTTP", *In Proceedings of ACM SIGCOMM '97 Conference on Applications, Technologies, Architectures and Protocols for Computer Communication* (Sep. 1997), pp. 181-194.

Padhye, Jitendra, et al., "Modeling TCP Throughput: A Simple Model and its Empirical Validation", *in Proceedings of ACM SIGCOMM '98 Proceedings on Applications, Technologies, Architectures, and Protocols for Computer Communications* (Aug. 1998), pp. 303-314.

Paxson, Vern, "End-to-End Internet Dynamics", *in Proceedings of ACM SIGCOMM '97 Conference on Applications, Technologies, Architectures, and Protocols for Computer Communications* (Sep. 1997), pp. 139-152.

Ratnasamy, Sylvia, et al., "Inference of Multicast Routing Trees and Bottleneck Bandwidths Using End-to-End Measurements", *in Proceedings of IEEE INFOCOM '99 The Conference on Computer Communications; vol. 1, Eighteenth Annual Joint Conference of the IEEE Computer and Communications Societies* (Mar. 1999), pp. 353-360.

Rubenstein, Dan, et al., "Detecting Shared Congestion of Flows via End-to-End Measurement", *in Proceedings of ACM SIGMETRICS, '2000 International Conference on Measurement and Modeling of Computer Systems* (Jun. 2000), pp. 145-155.

Seshan, Srinivasan, et al., "SPAND: Shared Passive Network Performance Discovery", *in Proceedings of 1st USENIX Symposium on Internet Technologies and Systems* (Dec. 1997), pp. 135-146.

Tsang, Yolanda, et al., "Passive Network Tomography Using EM Algorithms", *in Proceedings of the IEEE International Conference on Acoustics, Speech, and Signal Processing*, vol. III of IV (May 2001), pp. 1469-1472.

Zhang, Yin, et al., "On the Constancy of Internet Path Properties", *in Proceedings of ACM SIGCOMM Internet Measurement Workshop* (Nov. 2001), pp. 197-211.

Zhang, Yin, et al., "The Stationarity of Internet Path Properties: Routing Loss, and Throughput", *Computer Science Department, Cornell University* (May 2000), 14 pages.

Nahum, Erich, M., et al., "The Effects of Wide-Area Conditions on WWW Server Performance", *in Proceedingd of ACM Sigmetrics 2001/Performance 2001, Performance Evaluation Review* (Jun. 2001), vol. 29, No. 1, pp. 257-267.

Qui, Lili, et al., "Server-Centric View of Internet Performance: Analysis and Implications", Microsoft Research, Technical Report MSR-TR-2001-78, pp. 1-16, Sep. 2001.

A. Kumar, "Comparative Performance Analysis of Versions of TCP in a Local Network with a Lossy Link", IEEE/ACM Transactions on Networking, vol. 6, No. 4, Aug. 1998, 13 pages.

Caceres, R. et al., "Loss-based inference of multicast network topology", Decision and Control, Proc. of the 38th IEEE, 1999, Conf. vol. 3, pp. 3065-3070, ISBN: 0-7803-5250-5.

Duffield, N.G. et al., "Multicast topology inference from measured end-to-end loss", Information Theory, IEEE Transactions, vol. 48, Issue 1, Jan. 2002, pp. 26-45, ISSN: 0018-9448.

Padmanbhan, V.N. et al., Passive Network Tomography Using Bayesian Inference, Microsoft Research, 2002, pp. 93-97.

Bu, T. et al., "Network Tomography on General Topologies", vol. 1, Issue 1, Jun. 2002, ISSN: 0163-5999, 10 pages.

Ratnasamy, S., "Scaling Multicast Transports Through End-to-end Topology Discovery", dissertation, 1997, pp. 1-43.

Ziotopoulos, A. et al., "Estimation of Network Link Loss Rates Via Chaining in Multicast Trees", ICASSP 2001, 4 pages.

Coates, M. et al., "Network Loss Inference Using Unicast End-to-End Measurement", ITC Seminar on IP Traffic, Measurement and Modelling, Monterey, CA, pp. 28:1-28:9, Sep. 2000.

Office Action mailed Jan. 18, 2007 for U.S. Appl. No. 10/356,059.

Notice of Allowance mailed Aug. 1, 2007 for U.S. Appl. No. 10/356,059.

Office Action mailed Sep. 8, 2006 for U.S. Appl. No. 10/378,332.

Office Action mailed Feb. 21, 2007 for U.S. Appl. No. 10/378,332.

Advisory Action mailed May 29, 2007 for U.S. Appl. No. 10/378,332.

\* cited by examiner

METHOD AND SYSTEM FOR IDENTIFYING LOSSY LINKS IN A COMPUTER NETWORK

RELATED ART

This application is based on provisional application No. 60/407,425, filed Aug. 30, 2002, entitled "Method and System for Identifying Lossy Links in a Computer Network."

TECHNICAL FIELD

The invention relates generally to network communications and, more particularly, to methods and systems for identifying links in a computer network that are experiencing excessive data loss.

BACKGROUND

Computer networks, both public and private, have grown rapidly in recent years. A good example of a rapidly growing public network is the Internet. The Internet is made of a huge variety of hosts, links and networks. The diversity of large networks like the Internet presents challenges to servers operating in such networks. For example, a web server whose goal is to provide the best possible service to clients must contend with performance problems that vary in their nature and that vary over time. For example performance problems include, but are not limited to, high network delays, poor throughput and high incidents of packet losses. These problems are measurable at either the client or the server, but it is difficult to pinpoint the portion of a large network that is responsible for the problems based on the observations at either the client or the server.

Many techniques currently exist for measuring network performance. Some of the techniques are active, in that they involve injecting data traffic into the network in the form of pings, traceroutes, and TCP connections. Other techniques are passive in that they involve analyzing existing traffic by using server logs, packet sniffers and the like. Most of these techniques measure end-to-end performance. That is, they measure the aggregate performance of the network from a server to a client, including all of the intermediate, individual network links, and make no effort to distinguish among the performance of individual links. The few techniques that attempt to infer the performance of portions of the network (e.g., links between nodes) typically employ "active" probing (i.e., inject additional traffic into the network), which places an additional burden on the network.

SUMMARY

In accordance with the foregoing, a method and system for identifying lossy links in a computer network is provided. According to various embodiments of the invention, the computer network has links for carrying data among computers, including one or more client computers. Packet loss rates are determined for the client computers and a system of equations express the relationship between the loss rates at the client computers and the loss rates at the links. An objective function is defined by the system of equations and one or more linear programming techniques are applied to the function in order to find a solution to the equations in which as few links as possible have high loss rates. From the solution, lossy links are identified as those links whose loss rates, as inferred from the solution, exceed a predetermined threshold.

Additional aspects of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention may be best understood from the following detailed description taken in conjunction with the accompanying drawings of which:

DETAILED DESCRIPTION

Prior to proceeding with a description of the various embodiments of the invention, a description of the computer and networking environment in which the various embodiments of the invention may be practiced will now be, provided. Although it is not required, the present invention may be embodied by programs executed in a computer. Generally, programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, mainframe computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
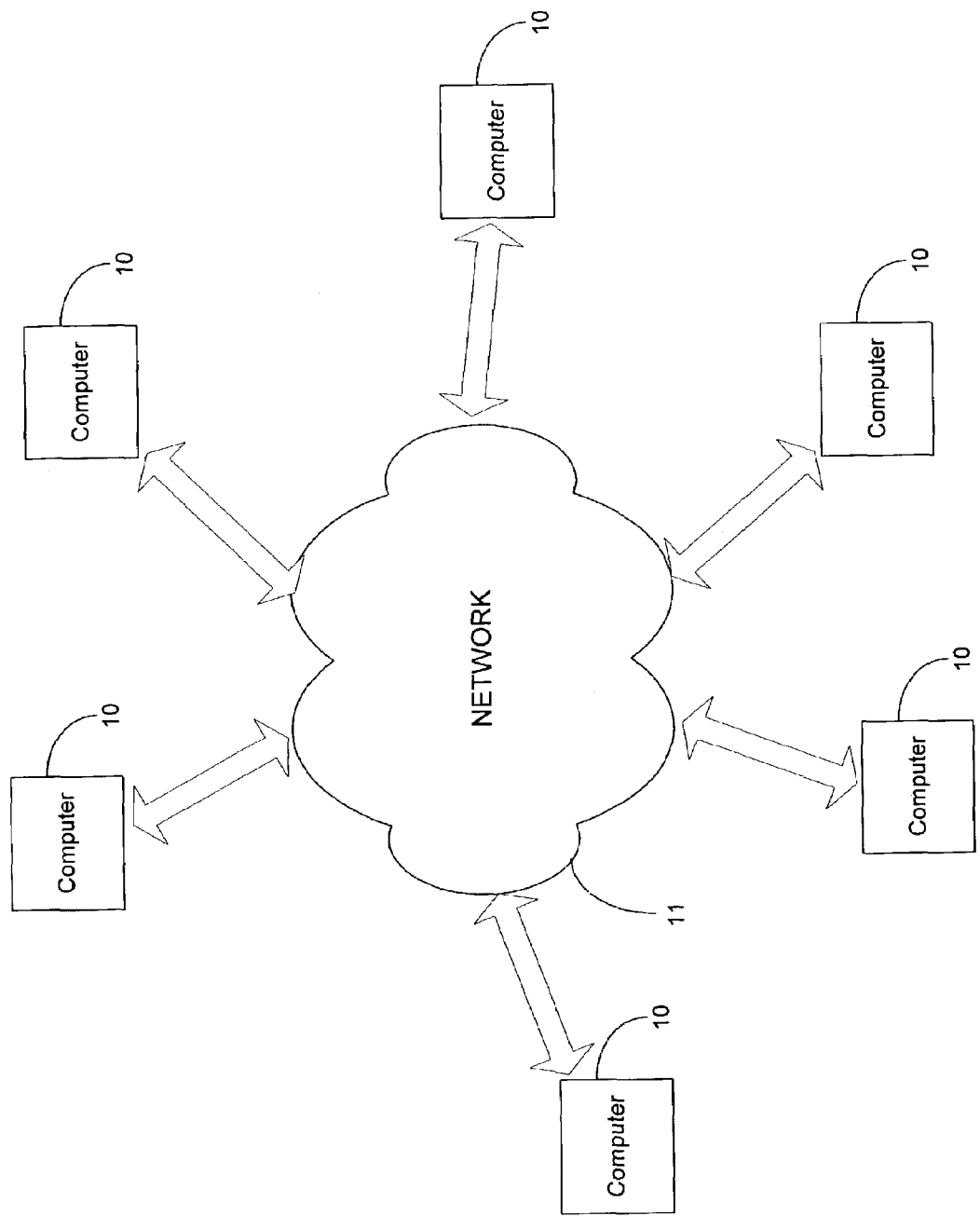
FIG. 1 illustrates an example of a computer network in which the invention may be practiced.

An example of a networked environment in which the invention may be used will now be described with reference to FIG. 1. The example network includes several computers 10 communicating with one another over a network 11, represented by a cloud. Network 11 may include many well-known components, such as routers, gateways, hubs, etc. and allows the computers 10 to communicate via wired and/or wireless media. When interacting with one another over the network 11, one or more of the computers may act as clients, servers or peers with respect to other computers. Accordingly, the various embodiments of the invention may be practiced on clients, servers, peers or combinations thereof, even though specific examples contained herein don't refer to all of these types of computers.

Figure 2:
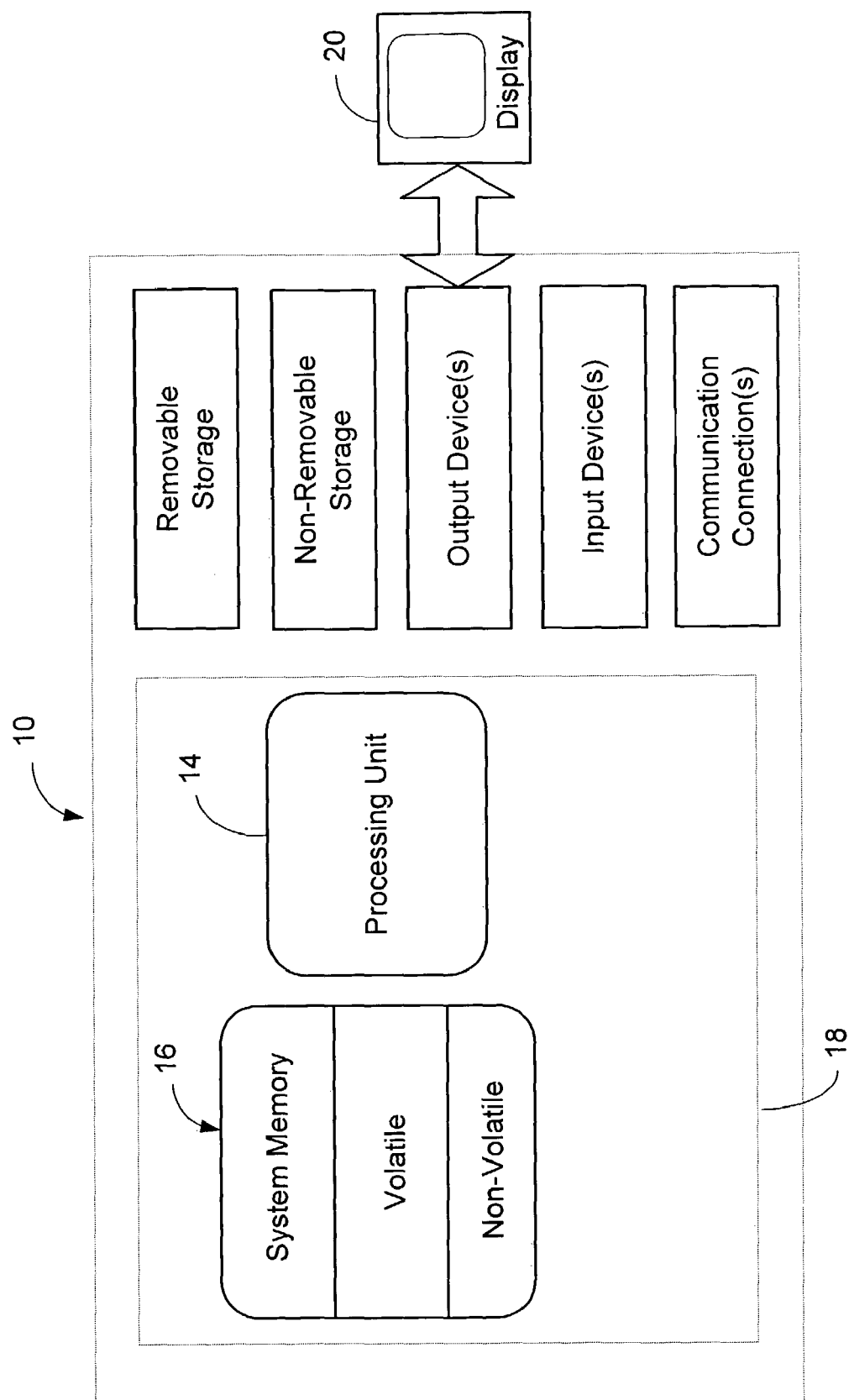
FIG. 2 illustrates an example of a computer on which at least some parts of the invention may be implemented.

Referring to FIG. 2, an example of a basic configuration for a computer on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 transmits electronic signals to other parts of the computer 10 and to devices outside of the computer 10 to cause some result. Depending on the exact configuration and type of the computer 10, the memory 16 is volatile (such as RAM), non-volatile (such as ROM or flash memory) or some combination of the two. This most basic configuration is illustrated in FIG. 2 by dashed line 18. Additionally, the computer may also have additional features/functionality. For example, computer 10 may also include additional storage (removable and/or non-removable) including, but not limited to, magnetic or optical disks or tape. In general, the storage media of the computer 10 includes volatile and non-volatile, removable and non-removable media implemented in any method or technology for storing information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

Computer 10 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term "computer-readable medium" as used herein includes both computer storage media and communication media.

Computer 10 may also have input devices such as a keyboard, mouse, pen, voice input device, touch input device, etc. Output devices such as a display 20, speakers, a printer, etc. may also be included. All these devices are well known in the art and need not be discussed at length here.

The invention is generally directed to identifying lossy links on a computer network. Identifying lossy links is challenging for a variety of reasons. First, characteristics of a computer network may change over time. Second, even when the loss rate of each link is constant, it may not be possible to definitively identify the loss rate of each link due to the large number of constraints. For example, given M clients and N links, there are M constraints (corresponding to each server—end node path) defined over N variables (corresponding to the loss rate of the individual links). For each client $C_j$, there is a constraint of the form $1-\Pi_{i \in T_j}(1-l_i)=p_j$, where $T_j$ is the set of links on the path from the server to the client $C_j$, $l_i$ is the loss rate of link i, and $p_j$ is the end-to-end loss rate between the server and the client $C_j$. If M<N, as is often the case, there is not a unique solution to this set of constraints.

The system and method described herein is intended for use on computer networks, and may be employed on a variety of topologies. The various embodiments of the invention and example scenarios contained herein are described in the context of a tree topology. However, the invention does not depend on the network topology being a tree.

Figure 3:
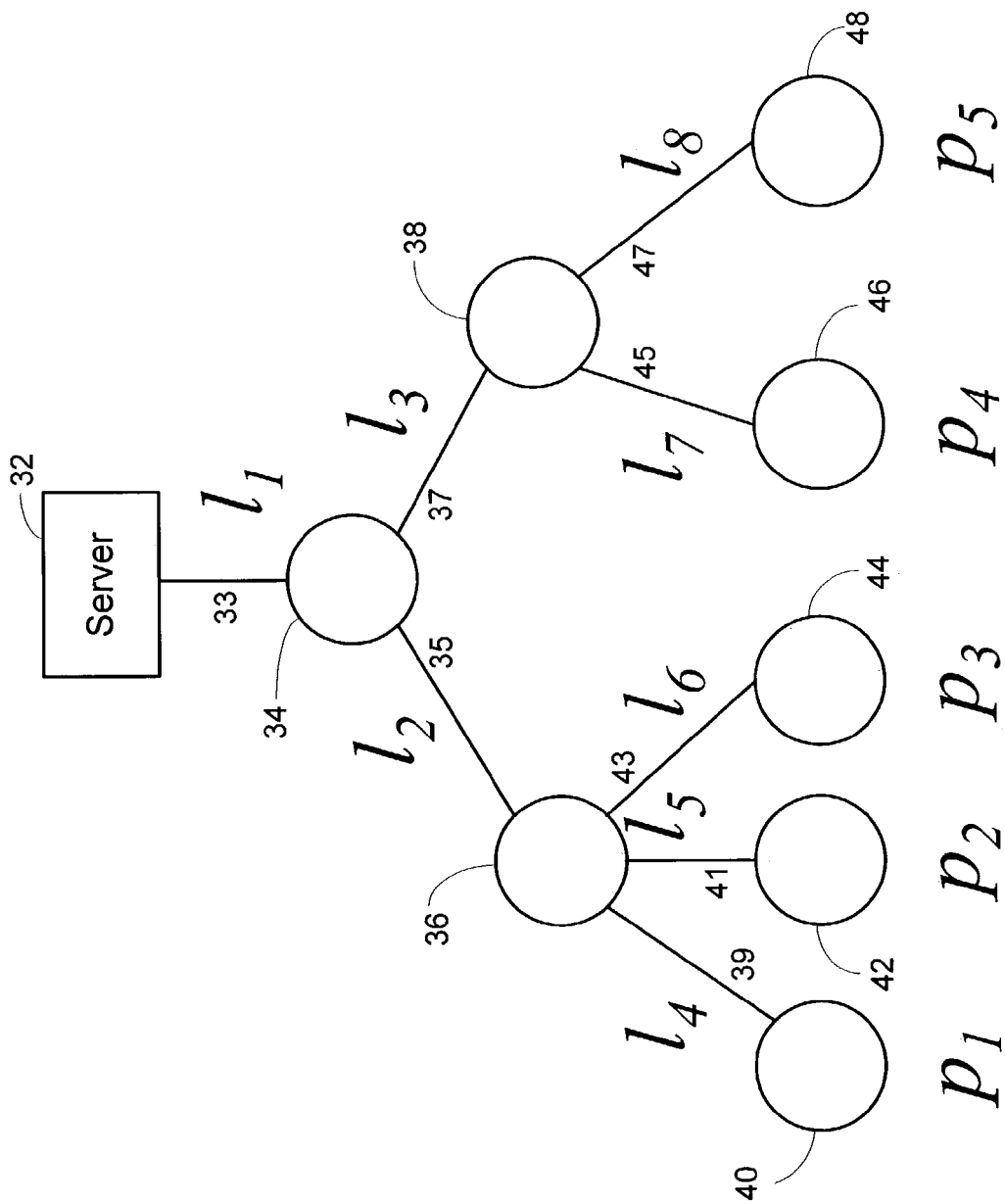
FIG. 3 illustrates a computer network in which an embodiment of the invention is used.

Referring to FIG. 3, a computer network 30, having a tree topology, is shown. The computer network 30 includes a server 32 and client computers 34, 36, 38, 40, 42, 44, 46 and 48. The client computers include a first client computer 34, a second client computer 36 and a third client computer 38. The client computers of the network 30 also include a first end node $C_1$, a second end node $C_2$, and third end node $C_3$, a fourth end node $C_4$ and a fifth end node $C_5$. Each end node has a loss rate associated with it. The loss rate represents the rate at which data packets are lost when traveling end-to-end between the server 32 and the end node. This loss rate is measured by a well-known method, such as by observing transport control protocol (TCP) packets at the server and counting their corresponding ACKs.

The network 30 also includes network links 33, 35, 37, 39, 41, 43, 45 and 47. Each network link has a packet loss rate associated with it. The packet loss rate of a link is the fraction of packets arriving at the link that don't make it across the link.

TABLE 1

Table 1 shows the meaning of the variables used in FIG. 3.

| Variable | Meaning |
| --- | --- |
| $l_1$ | loss rate of the link 33 between the server 32 and the first client computer 34 |
| $l_2$ | loss rate of the link 35 between the first client computer 34 and the second client computer 36 |
| $l_3$ | loss rate of the link 37 between the first client computer 34 and the third client computer 38 |
| $l_4$ | loss rate of the link 39 between the second client computer 36 and the first end node 40 |
| $l_5$ | loss rate of the link 41 between the second client computer 36 and the second end node 42 |
| $l_6$ | loss rate of the link 43 between the second client computer 36 and the third end node 44 |
| $l_7$ | loss rate of the link 45 between the third client computer 38 and the fifth end node 48 |
| $P_1$ | end-to-end loss rate between the server 32 and the first end node 40 |
| $P_2$ | end-to-end loss rate between the server 32 and the second end node 42 |
| $P_3$ | end-to-end loss rate between the server 32 and the third end node 44 |
| $P_4$ | end-to-end loss rate between the server 32 and the fourth end node 46 |
| $P_5$ | end-to-end loss rate between the server 32 and the fifth end node 48 |

For any given path between the server 32 and an end node, the rate at which packets reach the end node is equal to the product of the rates at which packets pass through the individual links along the path. Thus, the loss rates in the network 30 can be expressed with the equations shown in Table 2.

TABLE 2

$(1 - l_1)*(1 - l_2)*(1 - l_4) = (1 - p_1)$
$(1 - l_1)*(1 - l_2)*(1 - l_5) = (1 - p_2)$
$(1 - l_1)*(1 - l_2)*(1 - l_6) = (1 - p_3)$
$(1 - l_1)*(1 - l_3)*(1 - l_7) = (1 - p_4)$
$(1 - l_1)*(1 - l_3)*(1 - l_8) = (1 - p_5)$

Solving the equations shown in Table 2 presents several challenges. One challenge is that there are many more unknown values than there are equations.

Figure 4:
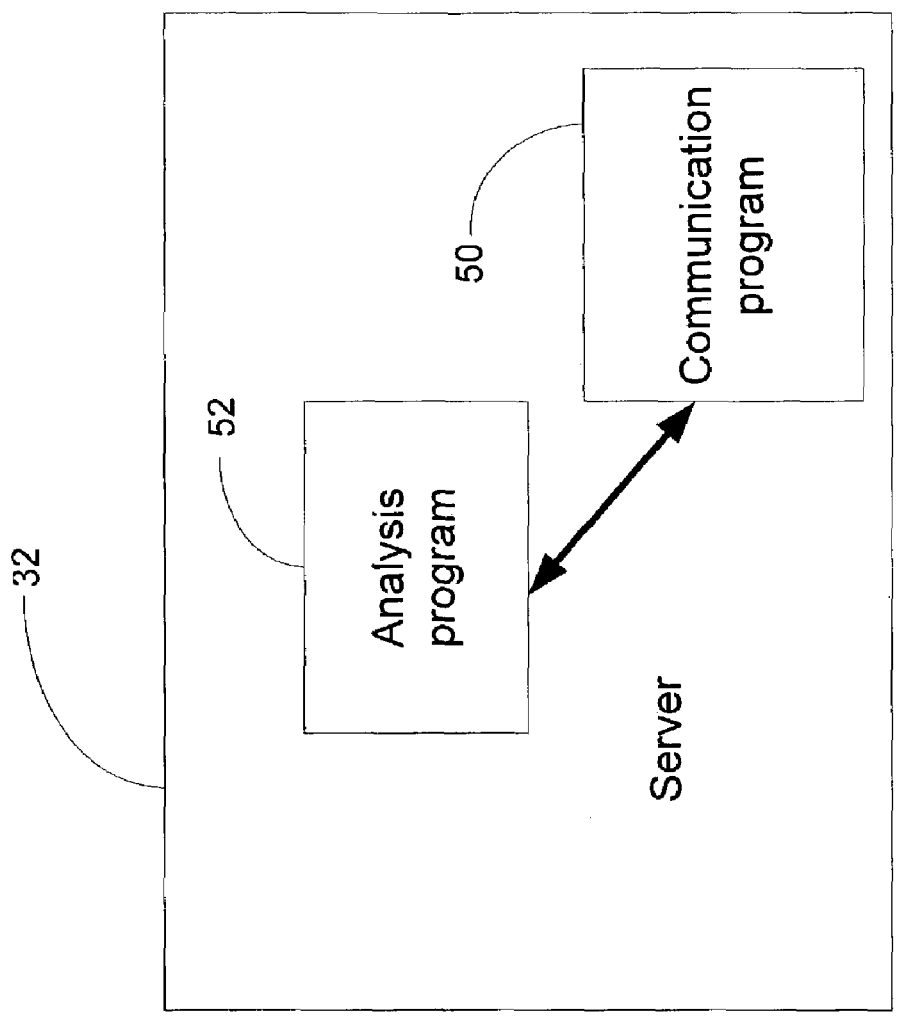
FIG. 4 illustrates programs executed by a server in an embodiment of the invention.

Referring to FIG. 4, a block diagram shows the programs that execute on the server 32 (from FIG. 3) according to an embodiment of the invention. The server 32 is shown executing a communication program 50 that sends and receives data packets to and from other computers in the network 30 (FIG. 3). The communication program 50 serves a variety of application programs (not shown) that also execute on the server 32. An analysis program 52 also executes on the server 32.

The analysis program 52 receives data from the communication program 50. The analysis program 52 may carry out some or all of the steps of the invention, depending on the particular embodiment being used.

The communication program 50 keeps track of how many data packets it sends to the each of the end nodes 40, 42, 44, 46 and 48 (FIG. 3). It also determines how many of those packets were lost en route based on the feedback it receives from the end nodes. The feedback may take a variety of forms, including Transport Control Protocol (TCP) ACKs and Real-Time Control Protocol (RTCP) receiver reports. The communication program 50 is also capable of determining the paths that packets take through the network 30 by using a tool such as trace route. Although the trace route tool does involve active measurement, it need not be run very frequently or in real time. Besides trace route, there are other ways to determine the paths that packets take, such as invoking the record route option (Ipv4) or extension header (Ipv6) on a small subset of packets. Thus, the communication program 50 gathers its data in a largely passive fashion.

The analysis program 52 identifies which link of the network 30 is excessively lossy by performing a statistical analysis on the data it receives from the communication program 50. In performing the statistical analysis, the goal of the analysis program 52 is not necessarily to infer a specific loss rate for each individual link of the network 30, but to identify those links that are likely to be excessively lossy. To accomplish this goal, the analysis program takes one or more steps to simplify the analysis. According to one step, for those links of a network path that have no branches, the analysis program 52 collapses the links into a single "virtual link." Thus, for example, the link 33 between the server 32 and the first client computer 34 (FIG. 3), may be a virtual link that actually comprises several different physical links, but without any additional branches that carry data packets down to any of the end nodes 40, 42, 44, 46 and 48.

Another step taken by the analysis program 52 to simplify its analysis is to assume that the loss rate of each link in the network 30 is constant. Although this is not necessarily a realistic assumption, it has been shown that, in many networks, some links consistently have high loss rates while others consistently have low loss rates. Since the goal of the analysis program 52 is to determine which links are likely to be excessively lossy, and not to determine exact loss rates, this assumption is reasonable.

As previously discussed, for each client $C_j$ of the network of FIG. 3, there is a constraint of the form $1-\Pi_{i \in T_j}(1-l_i)=p_j$. This constraint can be converted to a linear constraint of the form as follows:

$\Pi_{i \in T_j}(1-l_i)=1-p_j$ $\log(\Pi_{i \in T_j}(1-l_i))=\log(1-p_j)$ $\Sigma_{i \in T_j}\log(1-l_i)=\log(1-p_j)$ $-\Sigma_{i \in T_j}\log(1-l_i)=-\log(1-p_j)$ $\Sigma_{i \in T_j}\log(1/(1-l_i))=\log(1/(1-p_j))$ Therefore we have $\Sigma_{i \in T_j}L_i=P_j$, where $L_i=\log(1/(1-l_i))$ and $P_j=\log(1/(1-p_j))$. Additionally, a constraint on $L_i$ is that $L_i \geq 0$. The transformed variables $L_i$ and $P_j$ are monotonic functions of $l_i$ and $p_j$, respectively. According to an embodiment of the invention, the analysis program 52, introduces a slack variable, referred to herein as $S_j$, in the constraint for the client $C_j$, yielding a modified overall constraint of $\Sigma_{i \in T_j}L_i+S_j=P_j$. The slack variable $S_j$ permits the analysis program 52 to violate, to a limited extent, the constraint $\Sigma_{i \in T_j}L_i=P_j$. The analysis program 52 uses the slack variable $S_j$ to account for the possibility of errors in the computation of $p_1$-$p_5$. Such errors may result from anomalous measurements of packet loss rates made by the communication program 50, or temporal fluctuation in link loss rates and the like.

To determine the loss rates of the individual links $l_1$-$l_8$ (FIG. 3), the analysis program 52 attempts to minimize the following function:

$w\Sigma_i L_i + \Sigma_j |S_j|$

Minimizing the term $\Sigma_i L_i$ represents an attempt to obtain a parsimonious solution for the system of equations shown in Table 2. In other words, it represents an attempt to find a solution in which as few links as possible have high loss rates. Minimizing the term $\Sigma_j |S_j|$ represents an attempt to minimize the extent to which the constraint $\Sigma_{i \in T_j}L_i=P_j$ is violated. The constant w is a weight factor that the analysis program 52 uses to control the relative importance of finding a parsimonious solution versus the importance of minimizing the extent to which the constraint $\Sigma_{i \in T_j}L_i=P_j$ is violated. By default, the analysis program 52 sets w equal to one.

To simplify the actual computations required to minimize the objective function $w\Sigma_i L_i+\Sigma_j|S_j|$, the term $|S_j|$ is converted to $S'_j$, in which $S'_j \geq S_j$ and $S'_j \geq -S_j$. Thus, the function to be minimized becomes $w\Sigma_i L_i+\Sigma_j S'_j$, which is a linear objective function. Thus, the analysis program 52 solves the system of equations of Table 2 while minimizing the function $w\Sigma_i L_i+\Sigma_j S'_j$. This can be accomplished in a variety of ways. For example, the analysis program 52 may use any of a number of linear programming techniques. An example of a suitable linear programming technique is that used by the "linprog" function of the MATLAB® software package.

For the example shown in FIG. 3, we have the following linear program, where $p_1=0.12$, $p_2=0.15$, $p_3=0.1$, $p_4=0.02$, $p_5=0.05$. For w equals one (1), the problem is expressed as follows:

minimize $(L_1+L_2+L_3+L_4+L_5+L_6+L_7+L_8+S_1'+S_2'+S_3'+S_4'+S_5')$, subject to $(L_1+L_2+L_4+S_1=$ $L_1 + L_2 + L_5 + S_2 = P_2$
$L_1 + L_2 + L_6 + S_3 = P_3$
$L_1 + L_3 + L_7 + S_4 = P_4$
$L_1 + L_3 + L_8 + S_5 = P_5$

| | | | | |
|---|---|---|---|---|
| $S_1' + S_1 <= 0$ | $-S_2' + S_2 <= 0$ | $-S_3' + S_3 <= 0$ | $-S_4' + S_4 <= 0$ | $-S_5' + S_5 <= 0$ |
| $-S_1' - S_1 <= 0$ | $-S_2' - S_2 <= 0$ | $-S_3' - S_3 <= 0$ | $-S_4' - S_4 <= 0$ | $-S_5' - S_5 <= 0$ |

$L_1 >= 0$  $L_2 >= 0$  $L_3 >= 0$  $L_4 >= 0$  $L_5 >= 0$  $L_6 >= 0$  $L_7 >= 0$  $L_8 >= 0$

The above linear program can be solved using Mat lab (or another linear programming solver), which gave the following output:

| | | | | | | | |
|---|---|---|---|---|---|---|---|
| $L_1 = 0.0233$ | $L_2 = 0.0866$ | $L_3 = 0$ | $L_4 = 0.0075$ | $L_5 = 0.0215$ | $L_6 = 0$ | $L_7 = 0$ | $L_8 = 0.0121$ |

Based on $L_i = \log(1/(1-l_i))$, the link loss rate is inferred to be as follows:

| $L_1 = 0.023$ | $L_2 = 0.083$ | $L_3 = 0$ | $L_4 = 0.0075$ | $L_5 = 0.0213$ | $L_6 = 0$ | $L_7 = 0$ | $L_8 = 0.0121$ |
| --- | --- | --- | --- | --- | --- | --- | --- |

Based on the inferred link loss rate, a link is lossy if its loss rate exceeds a threshold. The level at which the threshold is set depends on a variety of factors, such as how high of a loss rate is serious enough to adversely impact the application that a network user wishes to run. In this example, if the threshold is set to be a five percent loss rate, then link $L_2$ is lossy with an inferred loss rate of 8.3 percent.

In view of the many possible embodiments to which the principles of this invention may be applied, the embodiments described herein with respect to the drawing figure are meant to be illustrative only and are not intended as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method for determining which of a plurality of links of a computer network are lossy, the network comprising a plurality of clients that communicate with a server over one or more of the plurality of links, the method comprising:
    establishing a system of equations that describes the relationship between the packet loss rates at the links and the packet loss rates at the clients;
    setting up constraints on the possible solutions to the system of equations;
    linearizing the constraints;
    deriving an objective function that represents both an aggregation of the packet loss rates for the plurality of links and an aggregate slack in the constraints, wherein the objective function comprises $\Sigma_i L_i + \Sigma_j |S_j|$, wherein $L_i = \log(1/(1-l_i))$ and $l_i$ is the loss rate of link i of the plurality of links and wherein $S_j$ is a slack variable representing the extent to which the constraint can be violated;
    calculating loss rates that solve the system of equations and give a minimum possible value for the function; and
    storing the calculated loss rates in a memory.

2. A computer-readable storage medium encoded with computer-executable instructions for performing the method of claim 1.

3. The method of claim 1 wherein each of the equations in the system expresses a product of success rates of links that form a path between the server and a particular client, wherein the product is the success rate of the particular client.

4. The method of claim 1 wherein one of the constraints is expressible as $1 - \Pi_{i \in T_j}(1-l_i) = p_j$, and wherein $T_j$ is the set of links on a path from the server to the client $C_j$, $l_i$ is the loss rate of link i, and $p_j$ is the end-to-end loss rate between the server and the client $C_j$.

5. The method of claim 4 wherein linearizing the constraints includes applying a log-transformation on each of the constraints so it becomes expressible as $\Sigma_{i \in T} L_i = P_j$, where $L_i = \log(1/(1-l_i))$ and $P_j = \log(1/(1-p_j))$.

6. The method of claim 1 wherein each of the plurality of clients communicates with the server over a subset of the plurality of links.

7. The method of claim 1 wherein the objective function further comprises a slack variable representing the extent to which each of the constraints may be violated in calculating the minimum possible value of the function.

8. The method of claim 1, wherein the objective function comprises $w \Sigma_i L_i + \Sigma_j |S_j|$, wherein w represents a relative importance of a parsimonious solution.

9. In a computer network comprising a plurality of links and a plurality of end nodes, a method for determining which one or more links of the plurality of links are lossy, wherein each link has a loss rate representing a rate at which data packets are lost on the link, and a success rate representing a rate at which packets are successfully transmitted over the link, the method comprising:
    establishing constraints relating the loss rates of the links and packet loss rates at the end nodes;
    introducing slack variables allowing the constraints to be violated to an extent;
    optimizing a function by minimizing (1) an aggregation of the loss rates of the links and (2) an aggregation of the slack variables, wherein the function is expressible in terms comprising $\Sigma_i L_i + \Sigma_j |S_j|$, wherein $L_i = \log(1/(1-l_i))$ and $l_i$ is the loss rate of link i of the plurality of links and wherein $S_j$ is a slack variable representing the extent to which the constraints can be violated;
    identifying from the optimization any links that violate a threshold value for loss rates or success rates; and storing the identified links in a memory.

10. The method of claim 9 wherein the function comprises a sum of a logarithm of an inverse of the success rates of the plurality of links.

11. The method of claim 10 wherein the function also comprises an aggregate slack in the set of constraints.

12. A computer-readable storage medium encoded with computer-executable instructions for performing the method of claim 9.

13. The method of claim 9 wherein at least one of the constraints is expressed as $1 - \Pi_{i \in T_j}(1-l_i) = p_j$, and wherein $T_j$ is the set of links on the path between nodes, $l_i$ is the loss rate of link i, and $p_j$ is the end-to-end loss rate between the nodes.

14. The method of claim 13, further comprising converting the constraint into a linear constraint that is expressible as $\Sigma_{i \in T_j} L_i = P_j$, where $L_i = \log(1/(1-l_i))$ and $P_j = \log(1/(1-p_j))$.

15. The method of claim 14, wherein the function is expressible in terms comprising $w \Sigma_i L_i + \Sigma_j |S_j|$, wherein w represents a relative importance of a parsimonious solution.

16. On a computer network comprising a plurality of links, each of the plurality of links having associated therewith a rate of loss for data attempting to pass through the link, a method for identifying a lossy link, comprising:
    modeling the network connections among nodes on the network so as to define loss rates for each connection and infer loss rates for each of the links comprising the connection;

identifying which links in the connections have inferred loss rates that exceed a predetermined rate, wherein the modeling of the network connections includes choosing the loss rate for each of the plurality of links so as to minimize a function comprising a summation over all of the links of the logarithm of the inverse of success rates for the plurality of links, and wherein the function also comprises an aggregate slack in a set of constraints, wherein the function is expressible in terms comprising $\Sigma_i L_i + \Sigma_j |S_j|$, wherein $L_i = \log(1/(1-l_i))$ and $l_i$ is the loss rate of link i of the plurality of links and wherein $S_j$ is a slack variable representing the extent to which the constraints can be violated; and storing the identified links in a memory.

17. A computer-readable storage medium encoded with computer executable instructions for performing the method of claim 16.

18. The method of claim 16 wherein the function is expressible in terms comprising $w\Sigma_i L_i + \Sigma_j |S_j|$, wherein w the relative importance of finding a parsimonious solution.

19. In a computer network having a plurality of links connecting a server to client computers and carrying data traffic between the server and client computers, a system for determining which of the plurality of links are lossy, the system comprising:

a model comprising (1) constraints relating packet loss rates at the links and packet loss rates at the clients, (2) slack variables relaxing the constraints, and, (3) a function representing both an aggregation of the packet loss rates for the plurality of links and an aggregation of the slack variables, wherein the function is expressible in terms comprising $\Sigma_i L_i + \Sigma_j |S_j|$, wherein $L_i = \log(1/(1-l_i))$ and $l_i$ is the loss rate of link i of the plurality of links and wherein $S_j$ is a slack variable representing the extent to which the constraints can be violated;

means for solving the model by finding a minimum value for the function, which thereby yields loss rates for the links in the network; and means responsive to the yielded loss rates for identifying lossy links and storing the identified lossy links in a memory.

20. The system of claim 19 wherein the model resides at the server.

21. The system of claim 20 wherein the means for solving and identifying is the server computer executing an analysis program.

22. The method of claim 1, wherein the method is performed without injecting test data into the computer network.

23. The method of claim 9, wherein the method is performed without injecting test data into the computer network.

* * * * *

UNITED STATES PATENT AND TRADEMARK OFFICE
CERTIFICATE OF CORRECTION

PATENT NO. : 7,421,510 B2
APPLICATION NO. : 10/360282
DATED : September 2, 2008
INVENTOR(S) : Venkata N. Padmanabhan et al.

Page 1 of 1

It is certified that error appears in the above-identified patent and that said Letters Patent is hereby corrected as shown below:

In column 6, line 45, after "$S_1=$" insert -- $P_1)$ --.

In column 8, line 44, in Claim 11, delete "claim 10" and insert -- claim 10, --, therefor.

Signed and Sealed this
Twenty-sixth Day of April, 2011

David J. Kappos
*Director of the United States Patent and Trademark Office*